US005900628A

United States Patent [19]

Ishihara

[11] Patent Number: 5,900,628

[45] Date of Patent: May 4, 1999

[54] METHOD OF PROCESSING MASS SPECTRUM

[75] Inventor: Morio Ishihara, Tokyo, Japan

[73] Assignee: JEOL Ltd., Tokyo, Japan

[21] Appl. No.: 08/825,894

[22] Filed: Apr. 2, 1997

[30] Foreign Application Priority Data

Apr. 3, 1996 [JP] Japan .................................... 8-081090

[51] Int. Cl.[6] ............................ G01D 59/44; H01J 49/00

[52] U.S. Cl. ............................................................ 250/282

[58] Field of Search ..................................... 250/281, 282

[56] References Cited

U.S. PATENT DOCUMENTS

| | | | |
|---|---|---|---|
| 4,707,602 | 11/1987 | Knorr | 250/282 |
| 4,761,545 | 8/1988 | Marshall et al. | 250/282 |
| 5,073,713 | 12/1991 | Smith et al. | 250/282 |
| 5,247,175 | 9/1993 | Schoen et al. | 250/282 |
| 5,440,119 | 8/1995 | Labowsky | 250/282 |

*Primary Examiner*—Bruce Anderson

*Attorney, Agent, or Firm*—Webb Ziesenheim Bruening Logsdon, Orkin & Hanson, P.C.

[57] ABSTRACT

There is disclosed a method of extracting information about the mass of a substance from a complex mass spectrum containing peaks arising from polyvalent ions. These polyvalent ions possess electric charges which are integral multiples of the elementary electric charge. Ions including these polyvalent ions are detected, and a mass spectrum is obtained. On the mass spectrum, ion intensity I is represented as a function of a variable x corresponding to mass-to-charge ratio. The mass spectrum, given by I(x), is transformed into a mass spectrum I(t) of a variable t, using the relation t=1/(x−H), where H is a unit mass of ions added to the polyvalent ions. Peaks appear on the mass spectrum I(t). Among these peaks, at least a given number of peaks appear at regular intervals. The spacing between these regularly spaced peaks is found.

13 Claims, 3 Drawing Sheets

METHOD OF PROCESSING MASS SPECTRUM

FIELD OF THE INVENTION

The present invention relates to a mass spectrometer for creating a mass spectrum of polyvalent ions having electric charges that are integral multiples of the elementary electric charge and for extracting information related to the mass of the original substance from this mass spectrum.

BACKGROUND OF THE INVENTION

FIG. 6 schematically shows the structure of the prior art mass spectrometer. This instrument has an ion source 23 producing ions. These ions are mass-analyzed by an electric field 24 and a magnetic field 25. The ions then pass through a slit 26 and reach a secondary electron multiplier 27, where they are detected. The output signal from the multiplier 27 is supplied via both an amplifier 17 and an A/D converter (ADC) 19 to a controller 22 incorporating a computer, where the signal is stored. The controller 22 controls a power supply 11 via a D/A converter (DAC) 12, the power supply 11 developing an accelerating voltage for the ion source 23 and an electric field voltage. The controller 22 also controls a magnetic field power supply 20 via a D/A converter (DAC) 21.

Where a mass analysis is made by magnetic field scanning, the controller 22 sends a scanning signal to the magnetic field power supply 20 via the DAC 21 while maintaining the accelerating voltage and the electric field voltage constant.

The controller 22 also controls a secondary electron multiplier power supply 15 via a D/A converter (DAC) 16. The controller sets the gain of the amplifier 17 via a gain controller 18. Furthermore, the controller reads the magnetic field strength from the output signal from a magnetic field strength detector circuit 13 via an A/D converter (ADC) 14. The magnetic field scanning is controlled according to the magnetic field strength read in this way.

As is well known in the art, in the mass spectrometer constructed as described above, the mass-to-charge ratio m/z, the magnetic field strength B in the magnetic field 25, and the ion-accelerating voltage V given by the ion source 23 generally satisfy the relation $$m/z=K(B^2/V) \qquad (1)$$

where K is a constant. Accordingly, if the magnetic field is scanned at a fixed value of the accelerating voltage V, then we have $$m/z=K_1B^2 \qquad (2)$$

where $K_1$ is a constant. Also, since the relation $$B=K_2t \qquad (3)$$

holds (where t is time and $K_2$ is a constant), we have $$m/z=K_3t^2 \qquad (4)$$

where $K_3$ is a constant. It is common practice to determine the masses of the substances under investigation by creating a table of reference peaks (i.e., masses) and positions at which they appear (or magnetic field strengths or emergence times) and performing calculations, based on this table. In this case, therefore, the operator usually measures the mass numbers of individual peaks during the preparation of the table and enters the measured mass numbers into the controller 22.

In the above-described mass spectrometer, the peaks appearing on a mass spectrum obtained by the conventional ionization technique are mostly derived from ions having the elementary electric charge. However, on a mass spectrum obtained by electrospray ionization techniques which have become widespread in recent years, there exist many peaks derived from ions having electric charges that are integral multiples of the elementary electric charge. Ions of this kind are hereinafter referred to as polyvalent ions. The integers are hereinafter referred to as valence numbers.

FIG. 2 is a diagram schematically illustrating a mass spectrum of polyvalent ions. The horizontal axis of the mass spectrum is usually expressed in m/z (i.e., ion mass m divided by ion valence number). On this axis, polyvalent ions having valence number n derived from a substance having mass m appear at positions given by $$x=(m+nH)/n=m/n+H \qquad (5)$$

where H is the mass of hydrogen, for example. In the case of electrospray technique, n hydrogen ions are attached to molecules with mass m, thus resulting in the aforementioned polyvalent ions. In this way, on a mass spectrum of polyvalent ions, many peaks attributed to ions having the same mass but different valence numbers arise, thus complicating the spectrum.

SUMMARY OF THE INVENTION

The present invention is intended to solve the foregoing problem. It is an object of the present invention to provide a method of processing a mass spectrum in such a way as to eliminate peaks originating from polyvalent ions.

The present invention lies in a method of processing a mass spectrum obtained by detecting ions including polyvalent ions having electric charges which are integral multiples of the elementary electric charge. Let I (x) be a function of a variable x that varies according to mass-to-charge ratio. This function I(x) is displayed as a mass spectrum. This mass spectrum I(x) is transformed into a mass spectrum I(t) of a variable t, using the relation $t=1/(x-H)$, where H is a unit mass of ions attached to the polyvalent ions. On the transformed mass spectrum I(t), plural peaks appear. Of these peaks, at least a given number of peaks appear at regular intervals. The spacing between these successive peaks is found.

Other objects and features of the invention will appear in the course of the description thereof, which follows.

DESCRIPTION OF THE PREFERRED EMBODIMENTS

Figure 1:
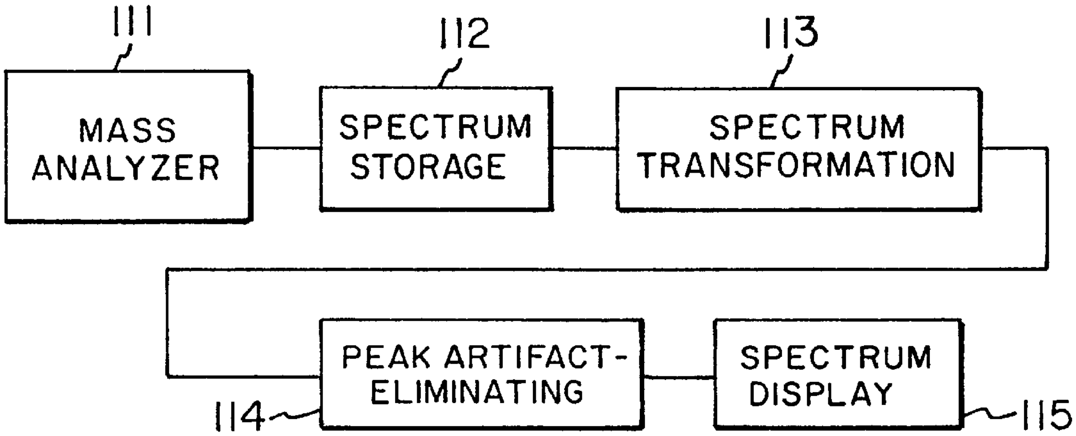
FIG. 1 is a block diagram of a mass spectrometer in accordance with the present invention.
Figure 2:
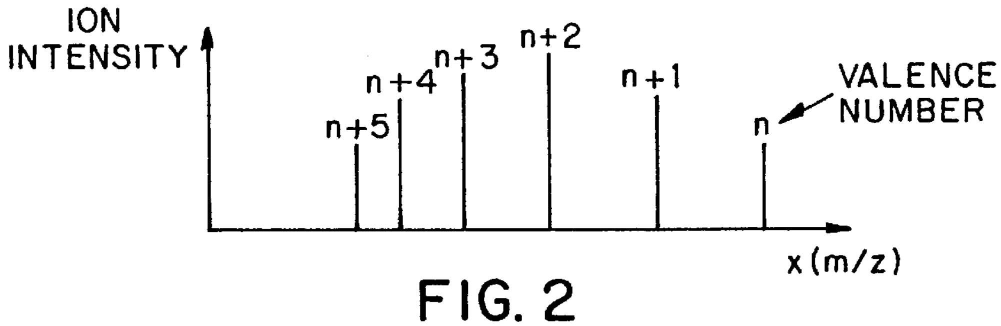
FIG. 2 schematically represents a mass spectrum of polyvalent ions.
Figure 3:
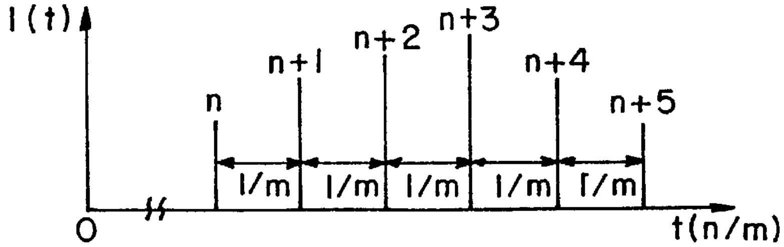
FIG. 3 represents a spectrum in which time t is plotted on the horizontal axis.
Figure 4:
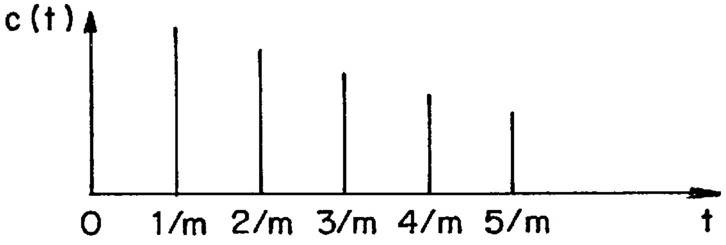
FIG. 4 is a diagram illustrating one example of multiple autocorrelation function.

A mass spectrometer embodying the concept of the present invention is shown in FIG. 1. A mass spectrum of polyvalent ions is schematically shown in FIG. 2. FIG. 3 shows one example of spectrum in which time t is plotted on the horizontal axis. FIG. 4 is a diagram of one example of multiple autocorrelation function.

Referring to FIG. 1, the mass spectrometer has a mass analyzer 111 that controls a magnetic field power supply to scan a magnetic field. Thus, a mass spectrum as shown in FIG. 2 is obtained. Data on the mass spectrum is stored in a spectrum storage portion 112. A spectrum transformation portion 113 transforms the mass spectrum stored in the spectrum storage portion 112 into a function of t, using the relation $$t=1/(x-H)$$

A peak artifact-eliminating portion 114 eliminates peak artifacts by detecting peaks which are produced from substances of the same mass m at regular intervals (1/m). A spectrum display portion 115 displays the output signal from the peak artifact-eliminating portion 114 as a spectrum in which t or 1/t is plotted on the horizontal axis.

The transformation of the mass spectrum and the elimination of peak artifacts are next described. As mentioned previously, polyvalent ions with mass m and valence number n appear at positions x on the mass-to-charge ratio (m/z) axis, the positions x being given by Eq. (5). Taking x as a variable indicating the mass-to-charge ratio axis, the variable x is defined as $$t=1/(x-H)=n/m \tag{6}$$

In an ordinary mass spectrum, ion intensity is represented by the function I(x), i.e., as a function of x. As a result of a transformation given by Eq. (6), ion intensity is represented by a function I(t), i.e., as a function of t. In this case, it follows that $$I(t)=I(x(t))\ x(t)=1/t+H \tag{7}$$

A spectrum in which t is plotted on the horizontal axis takes a form as shown in FIG. 3. The spectrum transformation portion 113 performs this transformation. The spectrum of FIG. 3 is characterized in that adjacent peaks of polyvalent ions are regularly spaced from each other. On the other hand, on the x-axis, adjacent peaks of polyvalent ions are not regularly spaced from each other, as can be seen from FIG. 2. The peak artifact-eliminating portion 114 defines the following function regarding the above function I(t), detects peak artifacts, and eliminate them. That is, generally, the following function is defined $$c(t)=\int_0^{\infty} I(s)I(s+t)\ldots I(s+kt)ds \tag{8}$$

Where the mass spectrum is composed of N discrete data items, the following equation is defined $$c(i)=\frac{1}{N-1}\sum_{j=1}^{N} I(j)I(j+i)\ldots I(j+ki) \tag{9}$$

This is an ordinary autocorrelation function when k=1. Therefore, this is hereinafter referred to as a multiple autocorrelation function, and k is referred to as multiplicity. The multiple autocorrelation function c(t) or c(i) defined in this way assumes large values at locations where t or i is equal to the peak spacing, as shown in FIG. 4. This has the following features:

(a) Substances of the same mass produce peaks which are spaced from each other by a constant distance 1/m.

(b) Among these peaks, the peak appearing first, i.e., the genuine peak, is greatest. This alone offers considerably useful information.

Normally, however, a simple spectrum as shown in FIG. 4 is not obtained, because there exist peaks arising from ions produced from substances of different masses. Rather, there are numerous peak artifacts other than the true peak (at 1/m). Peak artifacts are broadly classified into the following two categories:

(1) Peaks produced by the same constituent (i.e., the same substance) such as the peak appearing at 2/m. These peaks appear to have stemmed from substances having masses which are submultiples of the correct mass. These peaks are hereinafter referred to as subharmonic peaks.

(2) Peaks accidentally produced by interference of different constituents. These peaks are hereinafter referred to as accidental peaks and can be suppressed by increasing the multiplicity k of the multiple autocorrelation function c(t).

However, if the multiplicity is set greater than the number of peaks of polyvalent ions emanating from substances of the same mass, then the true peak corresponding to that mass will disappear. For example, where the multiplicity k is set to 3, if more than three peaks appear at regular intervals, then the multiple autocorrelation function c(t) will be found at some value. However, where only three peaks appear at regular intervals, if the multiplicity k is set to 5, the multiple autocorrelation function c (t) becomes equal to 0. Accordingly, it is necessary to set the multiplicity to an appropriate value. Unfortunately, it is normally difficult to know such multiplicity value in advance. In practical applications, therefore, a low multiplicity value is first used, and the resulting state is observed. The multiplicity value is gradually increased. In many cases, if the multiplicity is increased to some extent, many of peak artifacts become subharmonic peaks. Although it is difficult to eliminate accidental peaks, the subharmonic peaks can be easily removed by the following operations.

The function c(t) is processed from the lower limit $t_{min}$ of t to the upper limit $t_{max}$ as given by $$1<m<t_{max}/t \tag{10}$$

where the limits $t_{min}$ and $t_{max}$ have been predetermined. If every integer m satisfying the relation given by Eq. (10) caters for the relation $$mt<t_{max} \text{ and } c(t)>c(mt) \tag{11}$$

then, we assume the following relationship $$c(mt)=0 \tag{12}$$

Where more than two peaks appear at equal intervals and the peak closest to the origin is most intense, the above operations eliminate all peaks other than the peak closest to the origin. In consequence, subharmonic peaks can be fully eliminated.

The multiple autocorrelation function is found with an appropriate multiplicity in this way. If necessary, subharmonic peaks are eliminated and then the I(t) is displayed as a graph in which 1/t is plotted on the horizontal axis. It follows that this horizontal axis represents m/n (or m/z). A peak at n=1 is dominant. Consequently, the object of the present invention, i.e., peaks arising from polyvalent ions are reduced and the mass spectrum is simplified, has been accomplished.

Figure 5:
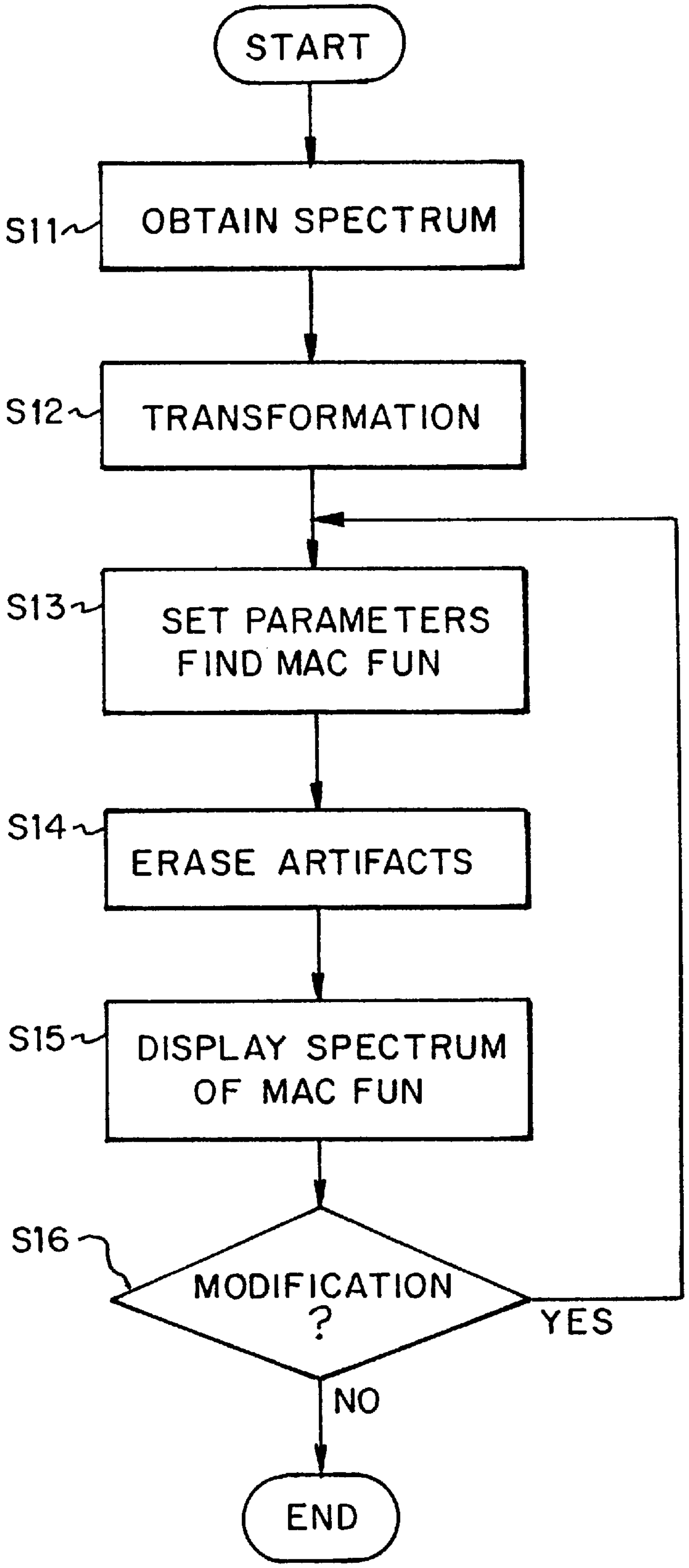
FIG. 5 is a flowchart illustrating a series of operations performed by a mass spectrometer in accordance with the invention.
Figure 6:
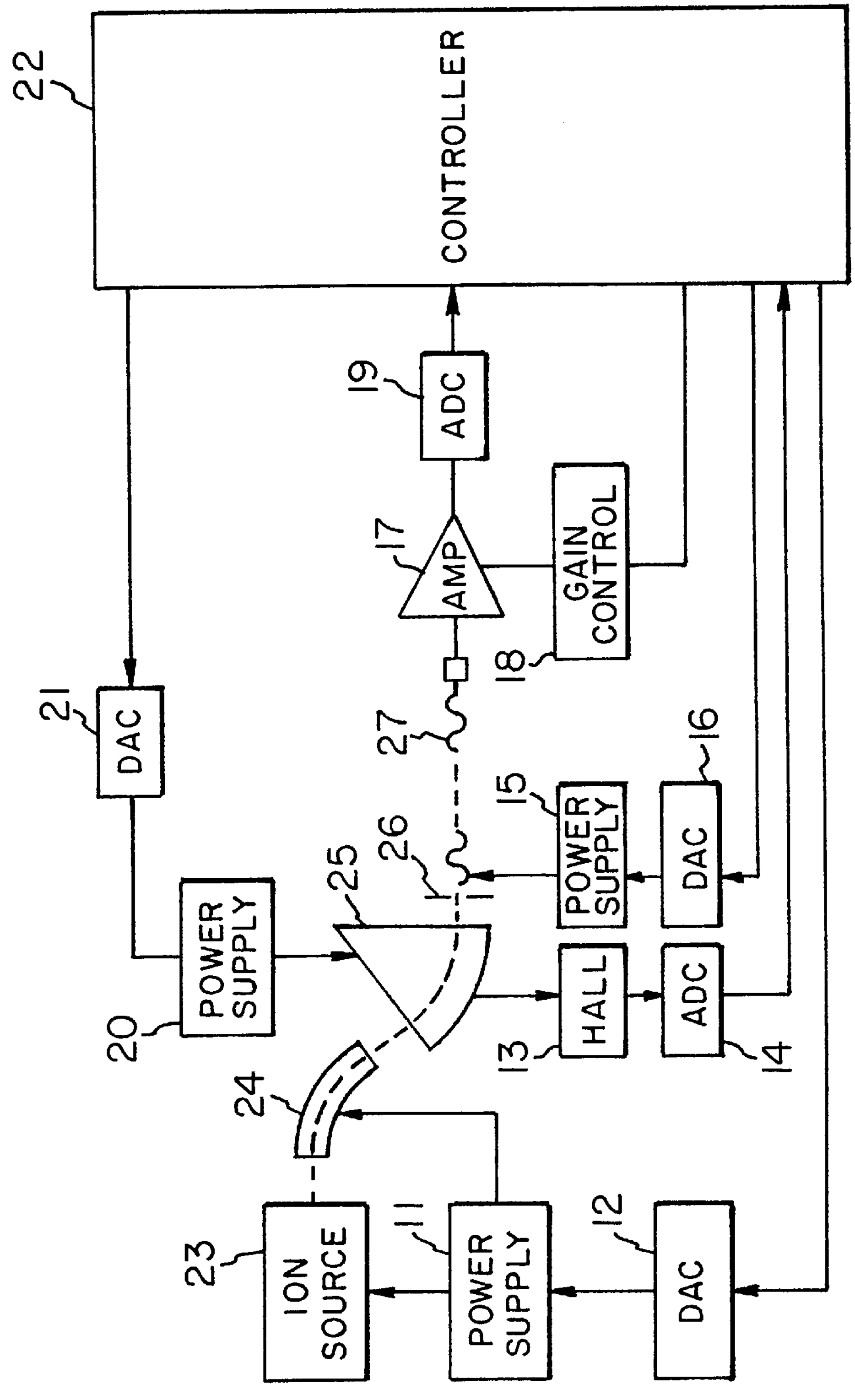
FIG. 6 PRIOR ART
FIG. 6 is a schematic block diagram of a mass spectrometer in accordance with the invention, illustrating the whole system.

The processing of the whole system is next described. FIG. 5 is a flowchart illustrating a series of operations performed by a mass spectrometer in accordance with the invention. As shown in FIG. 6, this mass spectrometer has a mass analyzer 111 which sends a scanning signal to a magnetic field power supply to scan the magnetic field, thus obtaining a mass spectrum as shown in FIG. 2. The spectrum is stored in a spectrum storage portion 112 (step 11).

Subsequently, the spectrum transformation portion 113 transforms the spectrum into a function of t given by Eq. (6) (step 12). Then an artifact-eliminating portion 114 finds a multiple autocorrelation (MAC) function under an appropriate multiplicity in accordance with the definitions given by Eq. (7) and the following equations (step 13). In this way, peak artifacts are eliminated (step 14).

The spectrum display portion 115 displays the found multiple autocorrelation function as a graph in which 1/t is plotted on the horizontal axis (step 15).

If results of a judgment made are that the multiplicity needs further modification, control goes back to step 13, where the multiplicity is reset. Then, similar operations are carried out (step 16).

In the present invention, autocorrelation function c(t) of I(t) where the multiplicity k is set to 1 can be used instead of the aforementioned multiple autocorrelation function. In particular, setting the multiplicity k to 1, Eqs. (8) and (9) can be modified into $$c(t)=\int_{-\infty}^{\infty} I(s)I(s+t)ds \tag{13}$$

$$c(i)=\sum_{J=1}^{N} I(j)I(j+i) \tag{14}$$

Unwanted information, i.e., peaks stemming from polyvalent ions, can be removed by repeating the above-described process to find an autocorrelation function of an autocorrelation function. This is described in further detail below.

We assume, for simplicity, that the initially found autocorrelation function c(t) has peaks which are located only at 1/m and 2/m and have a height of a. That is, c(1/m)=c(2/m)=a. Also, c(0)=1.

Calculation of an autocorrelation function $c_1$ (t) of c(t), using Eq. (13), results in $$\begin{aligned} c_1(1/m) &= c(0)c(1/m)+c(1/m)c(2/m) \\ &= a+a^2 \\ c_1(2/m) &= c(0)c(2/m)=a \end{aligned} \tag{15}$$

Thus, the ratio of peak heights is from 1:1 to (1 +a):1. Similarly, computation of an autocorrelation function on the assumption that $c_1$ (0)=1 gives rise to $$\begin{aligned} c_2(1/m) &= c_1(0)c_1(1/m)+c_1(1/m)c_1(2/m) \\ &= a+2a^2+a^3 \\ c_2(2/m) &= c_1(0)c_1(2/m)=a \end{aligned} \tag{16}$$

Here, the ratio is (1+2a+$a^2$):1. Also, we have $$c_3(1/m)=a+3a^2+3a^3+a^4 c_3(2/m)=a \tag{17}$$

Consequently, the ratio is (1+3a+3$a^2$+$a^3$) :1. If it is assumed that a=1=c (0) ,then the ratio of the height of the true peak to the height of peak artifacts has been already improved from 1:1 to as large as 8:1. Where a<<1, however, a great improvement is not made.

Accordingly, an appropriate threshold value is established. The above-described processing is repeated, using this threshold value as the value of $c_1(0)$. Then, the true peak grows greatly if the threshold value has been exceeded. As a result, peak artifacts can be eliminated almost completely. Finally, the results are plotted against 1/t. The horizontal axis of the obtained diagram represents m/n. A peak located at n=1 predominates in the diagram. Peaks attributed to polyvalent ions have been diminished, and the mass spectrum has been successfully simplified. In this way, the object of the invention has been accomplished.

Where c(0) is taken as a threshold value, every value may be normalized so that c(0)=1. In the above illustration, the spread of each peak has been neglected for simplicity. In practice, each peak has some spread, which is required to be taken into consideration. For instance, it is assumed that c(0)=1 holds within an appropriate range around 0.

The autocorrelation function may also be computed by Fourier transformation. In this case, the Wiener-Khintchine theorem, i.e., the autocorrelation function and power spectrum have a Fourier- transformed relation to each other, can be applied. More specifically, data of interest is Fourier-transformed. The data treated first is I(t). The data treated next is c(t). A power spectrum is found from the results of the Fourier transformations. The autocorrelation function can be found by inverse-Fourier-transforming the power spectrum. Since Fourier transform techniques involve a highly efficient computation method, known as fast Fourier transform, if the number of data items is large, the computation can be carried out using Fourier transform in a shorter time than where the autocorrelation function is calculated, using Eq. (13) or (14).

While the preferred embodiment of the invention has been described using specific terms, such description is for illustrative purposes only, and it is to be understood that changes and variations may be made without departing from the spirit or scope of the following claims. For instance, in the above embodiment, H is taken as the mass of hydrogen in Eq. (6) which transforms x into t. It is obvious that where added ions are other than hydrogen, H is taken as the mass of that kind of ions. Also, it is conceivable that H=0. This means a case in which only electric charges are added. Furthermore, similar results can be obtained by defining the multiple autocorrelation function as follows.

$$c(t)=\left[\int_0^{\infty} I(s)I(s+t)\ldots I(s+kt)ds\right]^{1/L} \tag{18}$$

$$c(t)=\int_0^{\infty} [I(s)I(s+t)\ldots I(s+kt)]^{1/L}ds \tag{19}$$

In the above equations, if it is assumed that L=k+1, the ratio of the heights of peaks arising from different constituents is conveniently made so large that it is comparable to the ratio of the peaks on the original spectrum.

Since a multiple autocorrelation function extracts information indicating the presence of peaks which have multiplicities of at least k and are regularly spaced from each other, any other kind of function can be used as long as information indicating the presence of such successive peaks can be extracted.

More specifically, a function F(s,t) of (k+1) data items is defined. These (k+1) data items comprise a certain value I(s) of I(t) and a finite number (k) of data items I(s+t), . . . , I(s+kt) all of which are spaced from each other at intervals of t. This function is integrated with respect to S from 0 to infinity to obtain $$c(t)=\int_0^\infty F(s,t)ds \quad (20)$$

Any desired function can be used as this function F(s,t) as long as c(t) can offer information indicating the presence of more than k peaks regularly spaced from each other.

For instance, the function F(s,t) may be used to compare the above-described (k+1) data items with a threshold value, to convert them into binary data items, and to AND the binary data items. In this case, if any one of the (k+1) data items is 0, then the AND is 0. It follows that any data items are removed unless they are at least (k+1) in number and regularly spaced from each other.

Furthermore, the harmonic mean 1/{(1/I(1))+(1/I (2))+(1/I(3))} may be found. In this case, if any one of I(1), I(2), and I(3) is less than a threshold value and becomes null, the harmonic mean is 0. As a result, any data items are removed unless they are at least three in number, regularly spaced from each other, and all exceed the threshold value.

On the t-axis, peaks appear at discrete positions n/m (n=1, 2, 3, etc.). Therefore, it is not always necessary to integrate the multiple autocorrelation function defined by Eqs. (8), (18), and (19) with respect to every variable. It suffices to integrate only the vicinities of s=n/m (n=1, 2, 3, etc.). Similarly, with respect to the function defined by Eq. (9), it is not always necessary to sum up every value of j. It suffices to add up only values close to j=n i (n=1, 2, 3, etc.).

As can be understood from the description provided thus far, in the present invention, a mass spectrum in which ion intensity I is represented as a function of variable x (m/z) is transformed into a function of t (n/m), using the relation t=1/(x−H). In consequence, peaks stemming from polyvalent ions of the same substance appear at regular intervals of 1/m. This makes it possible to detect and eliminate peak artifacts by a very simple algorithm. Also, information about the mass (or its inverse) of a substance producing polyvalent ions can be obtained by finding the multiple autocorrelation function of the spectrum described above. Moreover, peak artifacts appearing on the multiple autocorrelation function can be removed by increasing the multiplicity of the multiple autocorrelation function. In addition, those peak artifacts which are caused by polyvalent ions of the same substance can be removed.

What is claimed is:

1. A method of processing a mass spectrum obtained by detecting ions according to mass-to-charge ratio, said ions including polyvalent ions having electric charges which are integral multiples of elementary electric charge to obtain the mass values of individual species, said method comprising the steps of:

preparing a mass spectrum I(x) in which ion intensity I is represented as a function of a variable x corresponding to the mass-to-charge ratio;

transforming said mass spectrum I(x) into a mass spectrum I(t) about a variable t, using a relation given by t=1/(x−H) where H is a unit mass of ions added to said polyvalent ions;

finding spacing between peaks which appear at regular intervals on said mass spectrum I(t) and which exceed a given number, said spacing being indicative of the mass of a species in the mass spectrum; and reporting or displaying the spacing found in the preceding steps.

2. A method of processing a mass spectrum as set forth in claim 1, wherein said step of finding the spacing between the peaks which appear at regular intervals on said mass spectrum I(t) is carried out by finding a function given by $$c(t)=\int_0^\infty F(s,t)ds$$

where F (s, t) is a function regarding (k+1) data items comprising a certain value I(s) on the mass spectrum I(t) and a finite number (k) of data items I(s+t), . . . , I(s+kt) all of which are spaced from each other at intervals of t.

3. A method of processing a mass spectrum as set forth in claim 2, wherein said function F(s, t) is defined in terms of $$F(s,t)=I(s)I(s+t)\ \ldots\ I(s+kt).$$

4. A method of processing amass spectrum as set forth in claim 3, wherein the operation for finding the function c(t) or c(i) regarding the transformed mass spectrum I(t) is repeated with different values of the finite number k.

5. A method of processing a mass spectrum as set forth in claim 2, wherein said mass spectrum I(x) is composed of N discrete data items, and wherein a function c(i) given by $$c(i)=\frac{1}{N-1}\sum_{j=1}^{N} I(j)I(j+i)\ldots I(j+ki)$$

is found regarding said transformed mass spectrum I(t).

6. A method of processing a mass spectrum as set forth in claim 5, wherein the operation for finding the function c(t) or c(i) regarding the transformed mass spectrum I(t) is repeated with different values of the finite number k.

7. A method of processing a mass spectrum as set forth in claim 1, wherein said step of finding the spacing between the peaks which appear at regular intervals on said mass spectrum I(t) is carried out by finding harmonic mean of said mass spectrum I(t).

8. A method of processing a mass spectrum as set forth in any one of claims 1–5 and 7, further comprising the step of eliminating all peaks excluding a peak closest to an origin if more than two peaks are regularly spaced from each other and if said peak closest to said origin is most intense.

9. A method of processing a mass spectrum as set forth in claim 8, wherein said step of eliminating all peaks excluding the peak closest to the origin is to establish a relation c(mt)=0 if every integer m satisfying $1<m<t_{max}/t$ meets $$mt<t_{max} \text{ and } c(t)>c(mt)$$

where c(t) are data items to be processed.

10. A method of processing a mass spectrum obtained by detecting ions including polyvalent ions having electric charges which are integral multiples of elementary electric charge, said method comprising the steps of:

preparing a mass spectrum I(x) in which ion intensity I is represented as a function of a variable x corresponding to mass-to-charge ratio;

transforming said mass spectrum I(x) into a mass spectrum I(t) about a variable t, using a relation given by t=1/(x−H), where H, is a unit mass of ions added to said polyvalent ions;

finding an autocorrelation function of the transformed mass spectrum I(t); and finding an autocorrelation function of said found autocorrelation function.

11. A method of processing a mass spectrum as set forth in claim 10, wherein said autocorrelation functions are given by $$c(t) = \int_0^\infty I(s)I(s+t)ds.$$

12. A method of processing a mass spectrum as set forth in claim 10, wherein said mass spectrum I(x) is composed of N discrete data items, and wherein a function c(i) given by $$c(i) = \sum_{J=1}^{N} I(j)I(j+i)$$

is found regarding said transformed mass spectrum I(t).

13. A method of processing a mass spectrum as set forth in claim 10, wherein data to be processed are Fourier-transformed, a power spectrum of the Fourier-transformed data is found, and said power spectrum is inverse-Fourier-transformed in calculating said autocorrelation functions.

* * * * *